United States Patent [19]
Price et al.

[11] Patent Number: 6,053,455
[45] Date of Patent: Apr. 25, 2000

[54] SPACECRAFT ATTITUDE CONTROL SYSTEM USING LOW THRUST THRUSTERS

[75] Inventors: Xen Price, Redwood City; Thomas Randolph, San Carlos; Kam K. Chan, San Jose; Ahmed Kamel, Los Altos, all of Calif.

[73] Assignee: Space Systems/Loral, Inc., Palo Alto, Calif.

[21] Appl. No.: 09/010,718

[22] Filed: Jan. 22, 1998

Related U.S. Application Data

[63] Continuation-in-part of application No. 08/998,178, Dec. 24, 1997, abandoned.
[60] Provisional application No. 60/036,055, Jan. 27, 1997, and provisional application No. 60/036,054, Jan. 27, 1997.
[51] Int. Cl.[7] .................................................. B64G 1/26
[52] U.S. Cl. ............................. 244/169; 244/172
[58] Field of Search .................................. 244/169, 171, 244/165, 164, 173, 168, 172

[56] References Cited

U.S. PATENT DOCUMENTS

| | | | |
|---|---|---|---|
| 3,279,176 | 10/1966 | Boden ..................................... | 60/203.1 |
| 4,288,051 | 9/1981 | Goschel .................................. | 244/164 |
| 4,585,191 | 4/1986 | Blount .................................... | 244/169 |
| 4,821,508 | 4/1989 | Burton et al. .......................... | 60/203.1 |
| 4,825,646 | 5/1989 | Challoner et al. ...................... | 60/202 |
| 4,829,784 | 5/1989 | Berg et al. .............................. | 62/467 |
| 4,892,273 | 1/1990 | Fedor ..................................... | 244/158 |
| 5,130,931 | 7/1992 | Paluszek et al. ....................... | 244/164 |
| 5,251,855 | 10/1993 | Kaelsch ................................. | 244/172 |
| 5,257,802 | 11/1993 | Hablani .................................. | 244/164 |
| 5,312,073 | 5/1994 | Flament et al. ........................ | 244/168 |
| 5,339,623 | 8/1994 | Smith ..................................... | 60/203.1 |
| 5,386,953 | 2/1995 | Stuart ..................................... | 244/173 |
| 5,452,869 | 9/1995 | Busuthakur et al. ................... | 244/164 |
| 5,850,992 | 12/1998 | Flament et al. ........................ | 244/168 |
| 5,886,871 | 2/1999 | Birx ....................................... | 219/121.48 |

FOREIGN PATENT DOCUMENTS

| | | |
|---|---|---|
| 2-200599 | 8/1990 | Japan . |
| 5-155398 | 6/1993 | Japan . |

*Primary Examiner*—Robert P. Swiatek
*Attorney, Agent, or Firm*—Perman & Green, LLP

[57] ABSTRACT

A spacecraft, such as a geosynchronous weather or communications satellite, is constructed to include a plurality of low thrust thrusters mounted at predetermined locations on at least one of a spacecraft appendage or a spacecraft bus. The plurality of low thrust thrusters are fired in pairs for at least one of removing a disturbance torque or providing fine pointing attitude control. In one embodiment the low thrust thrusters are mounted on a solar array panel, thereby increasing the moment arm and enhancing the thrust output of the low thrust thrusters. In one embodiment a spacecraft has a plurality of low thrust thrusters arranged as at least two sets of two low thrust thrusters, individual ones of the low thrust thrusters of a set being disposed in a V-configuration and mounted at predetermined locations on at least one of a spacecraft appendage or a spacecraft bus. The plurality of low thrust thrusters are selectively fired for achieving control of 3-axes of spacecraft attitude or momentum.

33 Claims, 5 Drawing Sheets

SPACECRAFT ATTITUDE CONTROL SYSTEM USING LOW THRUST THRUSTERS

CLAIM OF PRIORITY FROM COPENDING APPLICATIONS

This patent application claims priority under 35 U.S.C. §1.119(e) from copending Provisional Patent Application No. 60/036,055, filed Jan. 27, 1997, entitled "Spacecraft Attitude Control System with Low Thrust Thrusters", by Kam K. Chan et al., the disclosure of which is incorporated by reference herein in its entirety. This patent application also claims priority under 35 U.S.C. §1.119(e) from copending Provisional Patent Application No. 60/036,054, filed Jan. 27, 1997, entitled "Spacecraft Attitude Control System with Four Low Thrust Thrusters", by Kam K. Chan, the disclosure of which is incorporated by reference herein in its entirety. This patent application further is a Continuation In Part of U.S. patent application Ser. No. 08/998,178 filed Dec. 24, 1997, now abandoned.

FIELD OF THE INVENTION

This invention relates generally to spacecraft attitude control systems and, in particular, to three axis stabilized spacecraft.

BACKGROUND OF THE INVENTION

Spacecraft perform various maneuvers after they are launched into space and once they are on-station in an intended orbit. For example, after a spacecraft is launched into a low orbit, it may be required to raise the spacecraft to a higher (e.g., geosynchronous) orbit by firing the spacecraft's main thruster. This type of maneuver is known as an orbit-raising maneuver. Also by example, after the spacecraft is on-station in a selected orbit, various forces (e.g., solar and/or other environmental disturbance torques, such as magnetic torques) may act on the spacecraft and cause the spacecraft to drift away from its selected orbit into another, incorrect orbit. Thus, periodic (e.g., daily, weekly, or monthly) orbital maneuvers are often required to return the spacecraft to the correct orbit. These types of maneuvers are known as station-keeping maneuvers.

During the performance of each type of maneuver, the precise control of the spacecraft's attitude to orient the spacecraft's payload, such as communication or imaging hardware, to a preselected planetary location and/or to correctly orient the spacecraft's thrust vector is essential. Thus, spacecraft are typically equipped with closed-loop control systems which enable the attitude of the spacecraft to be controlled within pre-established deadband limits. Such control systems often employ spacecraft thrusters for selectively producing torques on the spacecraft for correcting the spacecraft attitude. By example, during orbit-raising maneuvers, attitude control can be maintained by activating selected ones of the spacecraft's thrusters to create a desired torque in order to correct the spacecraft's attitude.

The following commonly assigned U.S. Patents are illustrative of various approaches to providing spacecraft attitude control: U.S. Pat. No. 5,459,669, Control System And Method For Spacecraft Attitude Control, to Adsit et al.; U.S. Pat. No. 5,400,252, Spacecraft East/West Orbit Control During A North Or South Stationkeeping Maneuver, to Kazimi et al.; U.S. Pat. No. 5,349,532, Spacecraft Attitude Control And Momentum Unloading Using Gimballed And Throttled Thrusters, to Tilley et al.; and U.S. Patent No. 5,222,023, Compensated Transition For Spacecraft Attitude Control, to Liu et al.

Reference can also be had to U.S. Pat. No. 5,184,790, Two-Axis Attitude Correction For Orbit Inclination, to Fowell; U.S. Pat. No. 4,931,942, Transition Control System For Spacecraft Attitude Control, to Garg et al.; U.S. Pat. No. 4,848,706, Spacecraft Attitude Control Using Coupled Thrusters, Garg et al.; U.S. Pat. No. 4,767,084, Autonomous Stationkeeping For Three-Axis Stabilized Spacecraft, to Chan et al.; U.S. Pat. No. 4,759,517, Station-Keeping Using Solar Sailing, to Clark; U.S. Pat. No. 4,599,697, Digital PWPF Three Axis Spacecraft Attitude Control, to Chan et al.; U.S. Pat. No. 4,521,855, Electronic On-Orbit Roll/Yaw Satellite Control, to Lehner et al.; U.S. Pat. No. 4,489,383, Closed-Loop Magnetic Roll/Yaw Control System For High Inclination Orbit Satellites, to Schmidt, Jr.; and U.S. Pat. No. 4,084,772, Roll/Yaw Body Steering For Momentum Biased Spacecraft, to Muhlfelder.

Reference is also made to a publication entitled "Attitude Stabilization of Flexible Spacecraft During Stationkeeping Maneuvers", Bong Wie et al., J. Guidance, Vol. 7, No. 4, pgs. 430–436, July-August 1984.

Reference can also be had to European Patent Application No. 0 499 815 Al, Triaxially Stabilized Satellite Provided with Electric Propulsors for Orbital Maneuvering and Attitude Control, to Mazzini.

Figure 5A:
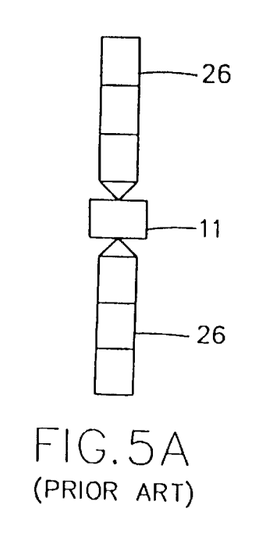
FIGS. 5A and 5B illustrate conventional solar array placements for a geosynchronous satellite.
Figure 5B:
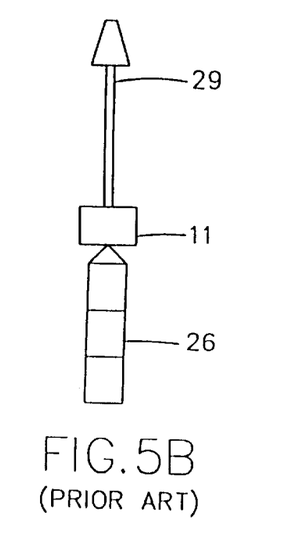

A typical geosynchronous satellite is designed to minimize solar torque imbalance. This is typically accomplished with symmetric solar array design, with the solar arrays 26 being located on the north and south side of the spacecraft (FIG. 5A), or in a configuration with the solar arrays 26 on the south side, balanced by a solar sail 29 on the north side (FIG. 5B). These appendages extend from a spacecraft bus 11. Residual solar and environmental disturbance torques are stored in momentum wheels that are then unloaded periodically using high thrust thrusters, magnetic torquers, trim tabs, or solar panel angle adjustments.

It can be appreciated that the inclusion of conventional momentum wheels and wheel unloading devices will typically increase the mass, complexity and cost of the spacecraft.

OBJECTS AND ADVANTAGES OF THE INVENTION

It is a first object and advantage of this invention to provide a three axis stabilized spacecraft that uses pairs of low thrust thrusters to achieve at least one of (a) a removal of a disturbance torque, or (b) fine pointing attitude control.

It is a second object and advantage of this invention to provide a three axis stabilized spacecraft that uses pairs of low thrust thrusters that are disposed on a body of the spacecraft to achieve at least one of (a) a removal of the disturbance torque, or (b) fine pointing attitude control.

It is a further object and advantage of this invention to provide a three axis stabilized spacecraft that uses pairs of pulse plasma thrusters that are disposed on a spacecraft appendage, for example at the ends of a solar array panel, to achieve at least one of (a) a removal of a disturbance torque, or (b) fine pointing attitude control.

It is another object and advantage of this invention to provide a three axis stabilized spacecraft that uses pairs of low thrust thrusters to compensate for solar torques, thereby simplifying the design of a spacecraft and eliminating or reducing a requirement for conventional momentum wheel unloading devices.

It is one further object and advantage of this invention to provide a three axis stabilized spacecraft that uses pairs of low thrust thrusters having thruster nozzles arranged in a V-configuration for providing torque capability to perform attitude control and momentum management.

SUMMARY OF THE INVENTION

The teaching of this invention uses low thrust thrusters to provide for the removal of solar and/or other environmental disturbance torques, such as magnetic torques, and to also enable fine on-orbit pointing of a spacecraft. The low thrust thrusters are controlled by a Low Thrust Thruster Attitude Control System (LTTACS). The use of the LTTACS is particularly beneficial for earth orbiting satellites having meteorological or communication payloads. The use of the LTTACS, in combination with the low thrust thrusters, is an alternative to conventional devices such as trim tabs, magnetic torquers, solar sails, and/or momentum wheels for momentum management and/or attitude control. The use of the low thrust thrusters enables these conventional devices to be eliminated for on-orbit momentum management or attitude control.

Furthermore, a 3-axis attitude control design is simplified in an all-thruster control system that meets the requirements for orbit raising, stationkeeping, and transition and normal on-orbit attitude control. The low thrust thrusters are particularly useful for transition and on-orbit control. While a conventional high thrust thruster system is preferably retained to meet orbit raising and stationkeeping needs, a spacecraft constructed and operated in accordance with this invention realizes a significant reduction in recurring and non-recurring cost.

In a presently preferred embodiment of this invention a spacecraft employs pairs of low thrust thrusters having thruster nozzles arranged in a V-configuration for providing torque capability to perform attitude control and momentum management.

In this embodiment a spacecraft has a plurality of low thrust thrusters arranged as at least two sets of two low thrust thrusters, individual ones of the low thrust thrusters of a set being disposed in a V-configuration and mounted at predetermined locations on at least one of a spacecraft appendage or a spacecraft bus. The plurality of low thrust thrusters are selectively fired or energized for achieving control of 3-axes of spacecraft attitude or momentum.

Also disclosed is a method for operating a spacecraft of a type comprising at least one solar array extending from a spacecraft bus and experiencing an asymmetric disturbance torque, such as a solar torque. The method includes steps of providing at least two sets of two low thrust thrusters coupled to the solar array, wherein individual ones of the low thrust thrusters of a set have thrust vectors disposed at an angle 74 one to another. The thrust vectors lie in at least one plane that intersects a plane of the solar array. The method further includes a step of selectively energizing the low thrust thrusters for achieving, in cooperation with the disturbance torque, a desired torque about any one of three spacecraft axes.

BRIEF DESCRIPTION OF THE DRAWINGS

The features of the invention are made more apparent in the ensuing Detailed Description of the Invention when read in conjunction with the attached Drawings, wherein.

DETAILED DESCRIPTION OF THE INVENTION

Figure 1:
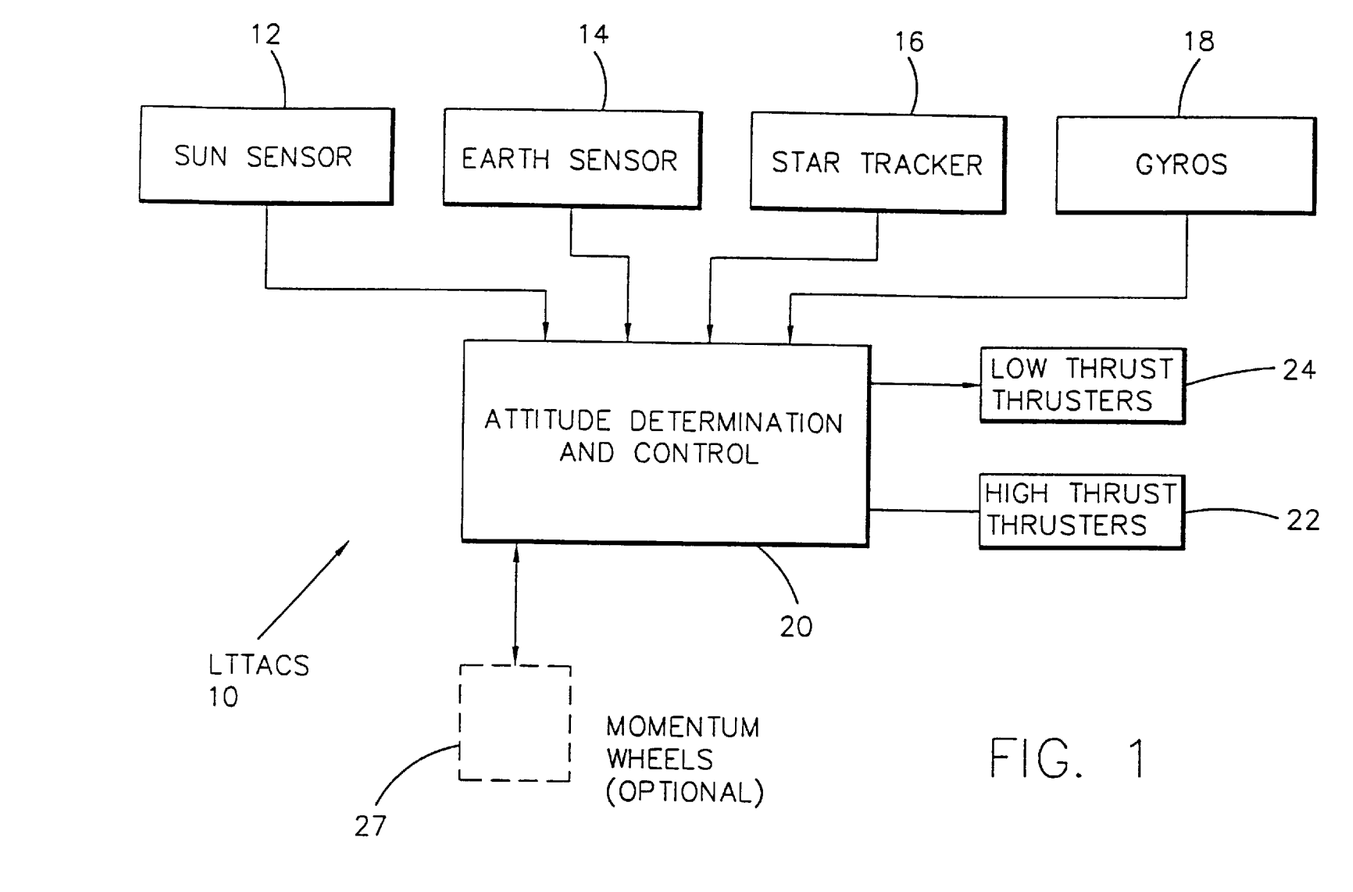
FIG. 1 is a block diagram of a spacecraft attitude determination and control system suitable for practicing this invention.

Referring to FIG. 1, the Low Thrust Thruster Attitude Control System (LTTACS) 10 includes an attitude determination and control system 20 that uses sensor inputs (e.g., from one or a combination of a sun sensor 12, an earth sensor 14, and a star tracker 16), in combination with an inertial sensor system (gyros 18), for thruster command generation. The spacecraft includes one or more high thrust thrusters 22 and a plurality of low thrust thrusters 24. By example, the high thrust thrusters 22 may be 22 Newton thrusters.

In general, the low thrust thrusters 24 are selected so as to have a low average thrust level (e.g., 10 micro-N to 10 milli-N), a small minimum impulse quantization (e.g., 10 micro-Ns to 1 milli-Ns), a large throttle ability range (e.g., at least from maximum thrust to 10% of maximum thrust), a high specific impulse (e.g., greater than 500 s), and a self-contained propellant supply. By example, the low thrust thrusters 24 may be pulse plasma thrusters or field emission electric propulsion thrusters.

The LTTACS 10 also provides a mechanism to transition from the high thrust thruster 22 used for ΔV to the low thrust thrusters 24 used for fine attitude control.

Any residual momentum can be absorbed by the low thrust thrusters 24 during transition from the high to the low thrust thrusters, either alone or in combination with optional momentum wheels 27. If the optional momentum wheels 27 are provided on the spacecraft, the low thrust thrusters 24 can be used to augment the operation of the momentum wheels 27, and/or to act as a back-up system in the case of the failure of a momentum wheel.

Unlike conventional thruster control systems that can only control thrusters mounted on the spacecraft body 11, the LTTACS 10 may also command low thrust thrusters 24 mounted on spacecraft appendages, such as solar array panel(s) 26 (FIGS. 2A, 2B and 2D), for maintaining attitude control. The LTTACS 10 uses the low thrust thrusters 24 to provide roll, pitch and yaw control torques to directly remove solar and other torque disturbances, and to control the spacecraft attitude to on-orbit pointing requirements.

Locating the low thrust thrusters 24 on the solar array panel 26 is beneficial in that it increases the moment arm about which the thrusters act. By example, thrusters located on the spacecraft bus may have a moment arm of about one meter, while thrusters located at the extremities of the solar array panel 26 can have a moment arm that is an order of magnitude larger. This is an important consideration, in that the operational lifetime of the low thrust thruster 24 may be limited, and the increased benefit in torque provided by the longer moment arm reduces the required firing time of the low thrust thrusters in order to achieve a given amount of correcting torque.

The placement of the low thrust thrusters 24 on the solar array panel(s) 26 also provides the benefit that the low thrust thrusters 26 can be aligned with the solar torque disturbance coordinate frame that acts on the solar arrays, thereby functioning to directly counter the solar torque (which acts as an inertial torque).

The LTTACS 10 generates high precision attitude knowledge from any one of the following three sensor combinations: (1) gyros 18 and star tracker 16, (2) gyros 18, star tracker 16 and earth sensor 14, or (3) gyros 18, earth sensor 14 and sun sensor 12. The low thrust thrusters 24 are then commanded to achieve fine on-orbit attitude control suitable for, by example, accurately pointing an imager payload or a communications payload for a 3-axis stabilized meteorological or communication satellite, respectively.

In greater detail, and referring to the Low Thrust Thruster Attitude Control System (LTTACS) 10 block diagram shown in FIG. 1, the on-board attitude determination and control system 20 uses the gyros 18 in combination with either: (1) the star tracker(s) 16, (2) the earth sensor(s) 14 and star tracker(s) 16, or (3) the earth sensor(s) 14 and sun sensor(s) 12 to provide low noise attitude measurement, thruster control logic to generate thruster on-time commands, and the low thrust thrusters 24 for torque output. The output of the high thrust thrusters 22 is controlled for orbit raising and $\Delta V$ maneuvers, while the outputs of the low thrust thrusters 24 are controlled for transition and normal on-orbit operations. The earth sensor(s) 14, sun sensor(s) 12, and gyros 18 can be used during orbit raising operations. As was stated previously, the momentum wheels 27 can be provided if desired.

The combination of: (1) star tracker 16, or (2) star tracker 16 and earth sensor 14, or (3) earth sensor 14 and sun sensor 12, is used to provide the spacecraft's reference roll, pitch and yaw attitude. This data is used by an on-board filter of the attitude determination and control system 20 to determine and remove drift in the gyros 18. The selected reference sensor(s) provide accurate long term spacecraft attitude knowledge, while the gyros 18 improve short term attitude knowledge. The reference sensors 12–16 and calibrated gyro 18 form an attitude determination system that can be described by the use of standard quaternion parameters [q1, q2, q3 and q4].

In order to generate torque commands, the desired trajectory for nadir pointing in terms of quaternion parameters is convolved by the controller 20 with propagated quaternions. The first three error quaternion [q1, q2, q3] and body rate [w1, w2, and w3] states are then multiplied by controller gains to generate thruster commands. The required torque is converted to an on-time (firing time) for selected pairs of the low thrust thrusters 24. Environmental and other disturbance torques, such as solar torque, magnetic torques, gravitational torques, and torques resulting from spacecraft-based actuators, may be removed directly by the firings of the low thrust thrusters 24. This control law is also used with the high thrust thrusters 22 during orbit raising for attitude control. Upon a transition from the use of the high thrust thrusters 22 to the low thrust thrusters 24, the controller gains are switched from high gains to low gains.

One suitable and presently preferred quaternion control method is disclosed in copending U.S. patent application Ser. No. 08/934,981, filed Sep. 22, 1997, which claims priority from Provisional Patent Application No. 60/028, 161, filed Oct. 16, 1996, entitled "Method to Reorient a Spacecraft Using Only Initial Single Axis Attitude Knowledge", by J. D. Stoen and K. Chan. The teaching of this invention is not, however, limited to this one technique and, in general, any of a number of conventional techniques for determining an attitude correction and required thruster firing on and off times can be used by the LTTACS 10.

Precise attitude pointing is maintained to within a specified attitude deadband, typically much less than 0.01 degrees about all axes, by selectively firing the low thrust thrusters 24.

Figure 2A:
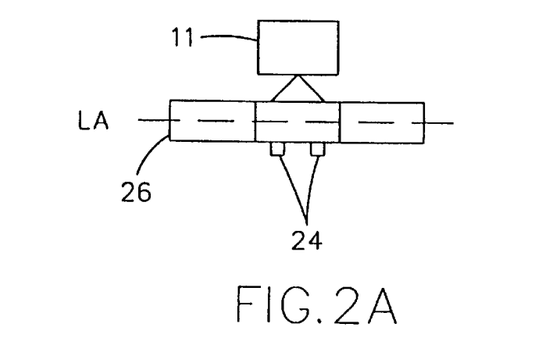
FIGS. 2A, 2B, 2C and 2D illustrate embodiments of spacecraft having low thrust thrusters for attitude control in accordance with an aspect of this invention.
Figure 2B:
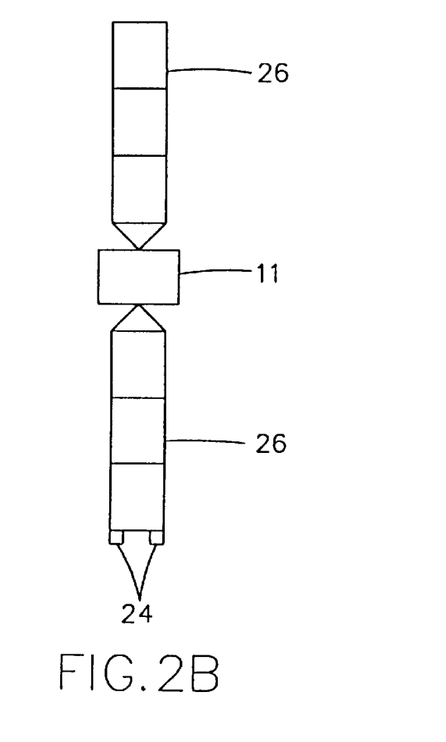
Figure 2C:
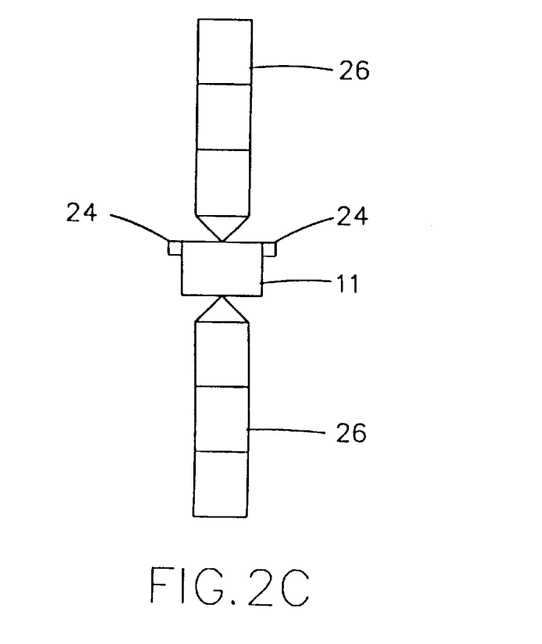
Figure 2D:
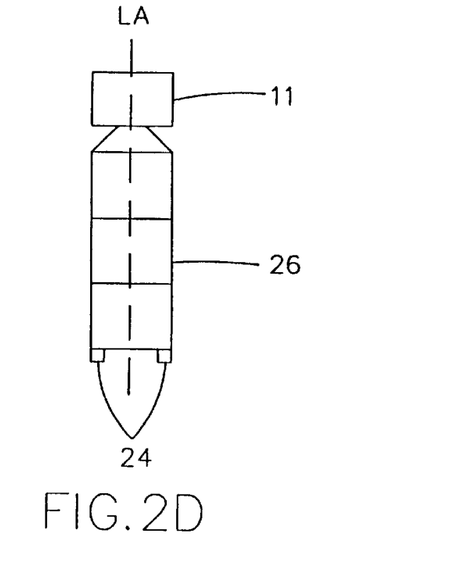

The conventional high thrust thrusters 22 are mounted on the main spacecraft body or bus 11. The low thrust thrusters 24, which are preferably lightweight and compact (having integrated propellant and hardware), can be mounted on the main spacecraft bus (as shown in FIG. 2C), or on any suitable appendages. As shown in FIGS. 2A, 2B, and 2D the low thrust thrusters 24 may be mounted, for example, at the periphery of one or more of the solar array panels 26. Reference in this regard can be had as well to FIGS. 6A and 6B.

For meteorological satellites having imaging hardware, by example, precise attitude knowledge provided by the attitude determination and control system 20 can be further corrected by the feed forwarding of satellite pointing error corrections to high bandwidth, 2-axis gimballed instrument payloads.

In a presently preferred, but not limiting embodiment of this invention, a spacecraft has four low thrust thrusters 24 to accomplish the following three goals.

(1) A first goal is to maintain high precision on-orbit attitude pointing with the low thrust thrusters 24, rather than with the (optional) momentum wheels 27.

(2) A second goal is to remove solar or other environmental disturbance torques with the low thrust thrusters 24, rather than using passive means, such as solar sails, or active means such as trim tabs and magnetic torquers.

(3) A third goal is to remove spacecraft momentum with the low thrust thrusters 24, rather than storing the momentum in momentum wheels.

The use of this invention has a number of advantages over the known prior art. These advantages include the following.

(1) A net savings in mass is realized by the removal of one or more of the trim tab, solar sail, momentum wheels, and magnetic torquers.

(2) A simplified spacecraft configuration design is realized since solar torque balancing is no longer a critical design parameter.

(3) A set of low thrust thrusters 24 (four low thrust thrusters in a presently preferred embodiment of the invention) is deployed in a configuration that enables both attitude control and the opposition of solar torque imbalance. A redundant set of four low thrust thrusters may also be provided.

(4) The low thrust thrusters 24 can be mounted on the solar array 26, or some other suitable spacecraft appendage, to maximize torque removal capability by increasing the moment arm about which the low thrust thrusters operate.

FIGS. 2A–2D illustrate spacecraft configuration designs that can remove the need for the above-described conventional trim tabs, symmetrically balanced solar arrays, solar sails, magnetic torquers and/or momentum wheels. FIGS. 2A, 2B, and 2D were discussed above. Note, for example, in FIGS. 2A and 2D that an asymmetric spacecraft bus, solar array panel configuration is used. The asymmetrical configuration of the spacecraft in FIGS. 2A and 2D generates a predetermined unidirectional environmental torque on the apacecraft. In FIG. 2A a longitudinal axis (LA) of the solar array panels 26 does not pass through the bus 11, while in FIG. 2D the longitudinal axis (LA) does pass through the spacecraft bus 11. FIG. 2C shows the low thrust thrusters 24 located on the spacecraft bus 11.

This invention provides a method to use the low thrust thrusters 24 to directly remove the torque disturbances and to provide attitude control.

Figure 3A:
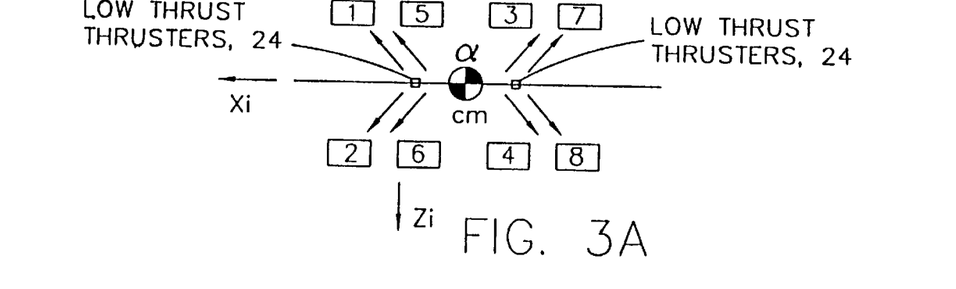
FIGS. 3A and 3B illustrate a first low thrust thruster configuration in accordance with this invention.
Figure 3B:
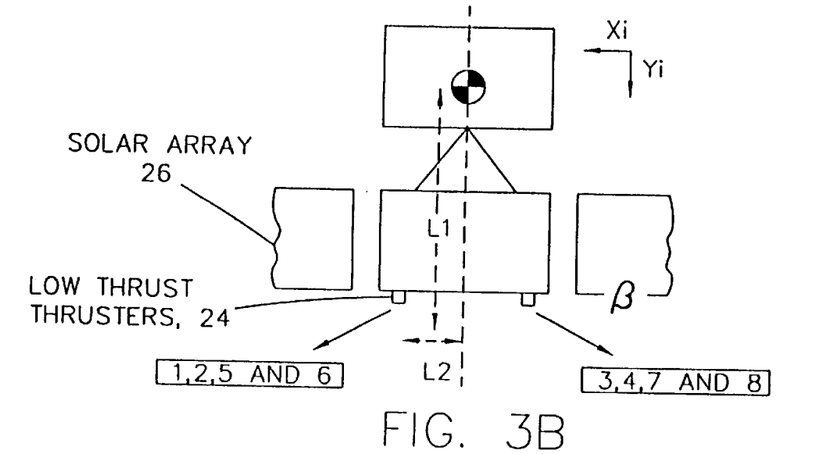

FIGS. 3A and 3B shows a first low thrust thruster configuration that produces the required torques to control a wide range of environmental disturbance torques, such as solar torque, magnetic torques, gravitational torques and disturbance torques from spacecraft-based actuators. FIG. 3A is a view looking end-on at the solar array 26 of FIG. 2A, while FIG. 3B is a top view of the solar array 26.

Two redundant sets of four low thrust thrusters 26 are mounted at, preferably, the end of the solar array 26. The total of eight thrusters are referred to as 1–8. The design parameters are the lengths L1 and L2, referenced to the center of mass (cm), and the thrust angles α and β, as shown in FIGS. 3A and 3B. Thrusters 1, 2, 3 and 4 form a first low thrust thruster set, while thrusters 5, 6, 7, and 8 form a second (redundant) low thrust thruster set. A given four thruster configuration provides an efficient means of generating inertial torque for the removal of environmental torque disturbances acting on the spacecraft with a minimum thruster set. Both positive and negative torques about each axis can be generated by engaging a pair of low thrust thrusters 24 having thrust vectors disposed at the angles α and β. Table 1 illustrates the net torque polarities that can be generated by engaging various low thrust thruster pairs.

TABLE 1

| Thruster Pair | 1 & 3 | 2 & 4 | 1 & 4 | 2 & 3 | 1 & 2 | 3 & 4 |
|---|---|---|---|---|---|---|
| Torque | +Txi | −Txi | +Tyi | −Tyi | +Tzi | −Tzi |

This torque actuator capability can also be created with the redundant low thrust thrusters 5, 6, 7 and 8 of the second set.

The four low thrust thruster configuration and thruster pairing embodied in this invention provides an efficient, low-mass technique to remove environmental disturbance torques. As an example, present low thrust thruster technology can provide force in the 0.0004 N range. The thruster configuration shown in this embodiment (with the large moment arms for increased efficiency) can thus provide torque capability in the range of 0.0012 Nm. This provides more than adequate control capability to remove expected environmental disturbance torques. Even for the case of a highly imbalanced spacecraft configuration, such as presented in FIGS. 3A and 3B, a factor of ten torque margin exists for solar torque mitigation and control.

The four low thrust thruster configuration and thruster pairing embodied in this invention also provides a technique by which an on-orbit attitude control system can simultaneously maintain fine attitude pointing. As an example, for a spacecraft with 2400 Kg-m$^2$ inertia, the body rate generated by a single thruster pulse is 0.5 μrad/sec. Fine attitude pointing to within a desired deadband can be maintained with the above-referenced attitude determination and control system 20 that commands actuation of the low thrust thruster pairs designated in Table 1. For the embodiment presented here, maintaining an exemplary ±25 μrad (0.0014 deg) roll attitude pointing deadband entails pulsing thruster pairs 1&3 (for +Txi) or 2&4 (for −Txi) an average of once every 100 seconds.

Figure 4A:
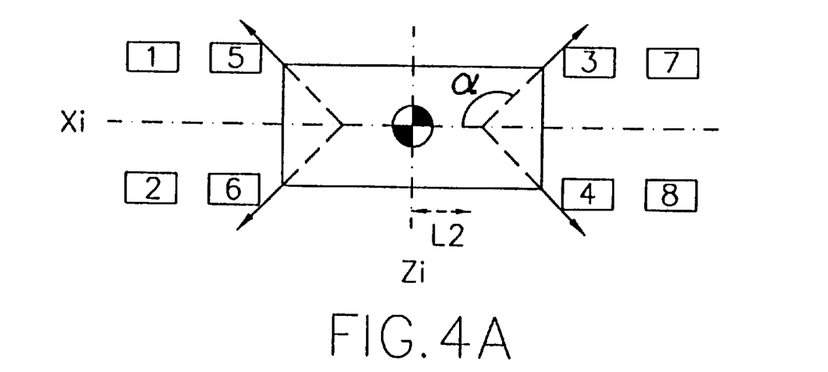
FIGS. 4A and 4B illustrate a second low thrust thruster configuration in accordance with this invention.
Figure 4B:
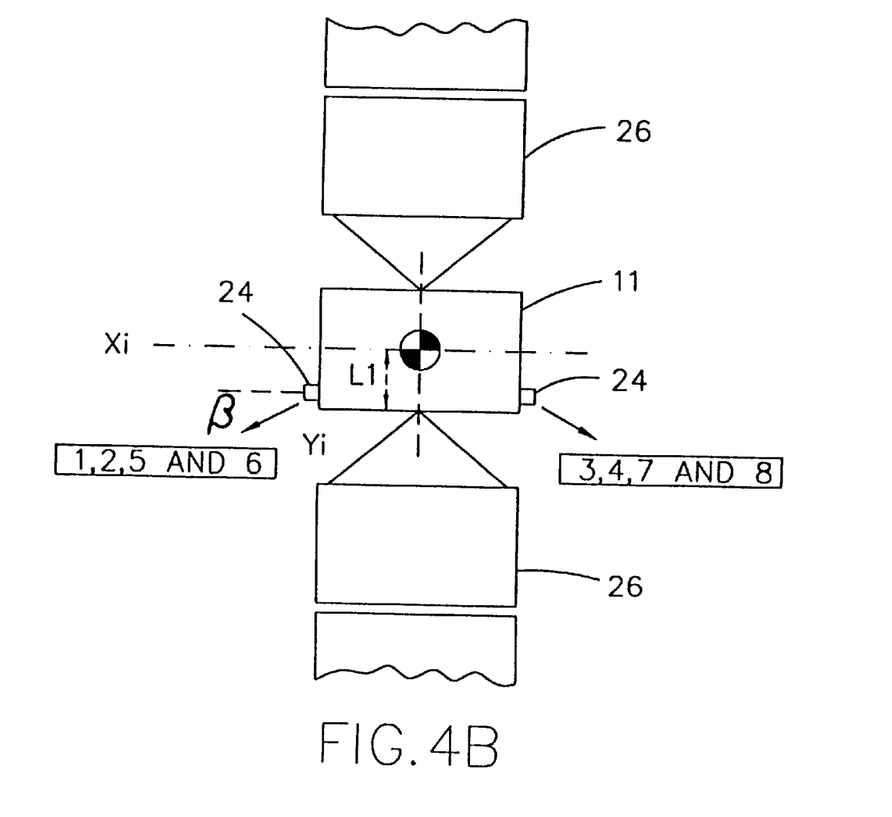

A second low thrust thruster embodiment is illustrated in FIGS. 4A and 4B. In this embodiment two redundant sets of low thrust thrusters 24 are mounted near the corners of the spacecraft bus 11. Thrusters 1, 2, 3 and 4 form a first set, while thrusters 5, 6, 7, and 8 form a second, redundant set. This thruster configuration provides an efficient mean of generating body torque for removal of environmental torque disturbances acting on the spacecraft with a minimum thruster set. Both positive and negative torques about each axis can be generated by engaging a pair of thrusters. Table 2 illustrates the net torque polarities that can be generated by engaging a thruster pair.

TABLE 2

| Thruster Pair | 1 & 3 | 2 & 4 | 1 & 4 | 2 & 3 | 1 & 2 | 3 & 4 |
|---|---|---|---|---|---|---|
| Torque | +Txb | −Txb | +Tyb | −Tyb | +Tzb | −Tzb |

These four thruster configuration and pairing arrangements thus provide a means to obtain fine pointing attitude control, and the capability to remove environmental disturbance torques with a minimum thruster set configuration.

The use of low thrust thrusters 24, such as pulse plasma thrusters or field emission electric propulsion, is especially beneficial as these units are typically electrically powered, and do not require fuel tanks, fuel lines, and other support equipment. This enables the placement of the low thrust thrusters 24 at locations on the spacecraft, such as the periphery of the solar array panel(s) 26, that would be difficult to achieve with conventionally fueled thrusters.

Figure 6A:
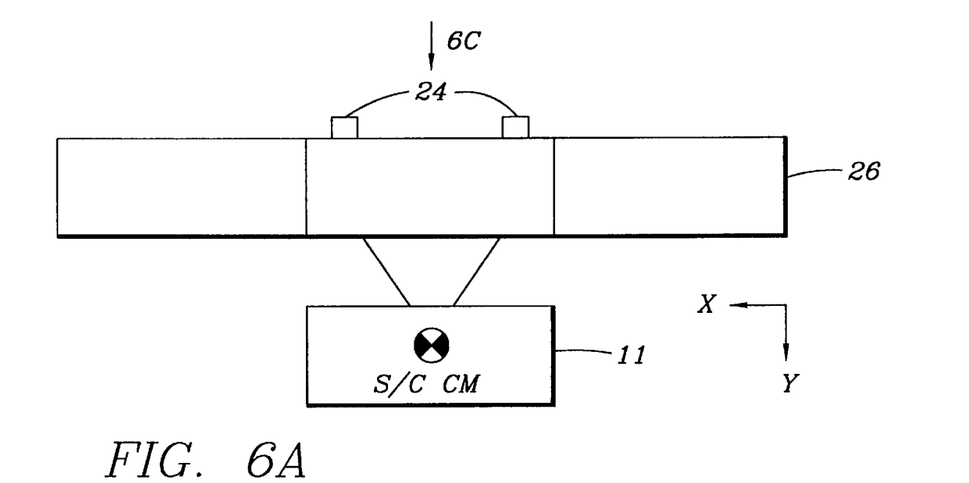
FIGS. 6A and 6B illustrate further embodiments of spacecraft with an asymmetric solar torque imbalance design that has low thrust thrusters positioned in accordance with an aspect of this invention.
Figure 6B:
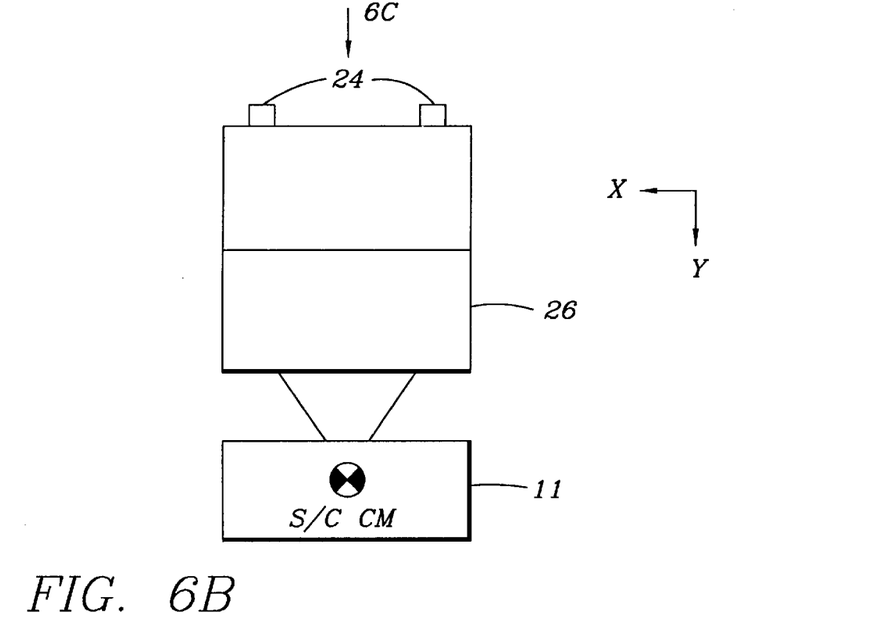
Figure 6C:
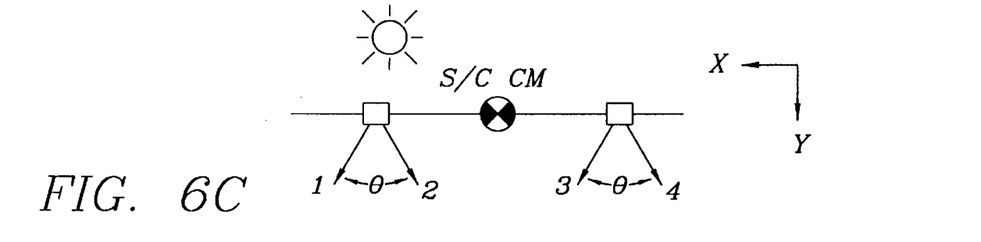
FIG. 6C illustrates two pairs of low thrust thrusters arranged in a V-configuration, the view of FIG. 6C looking at the edge of the solar array panel of either FIG. 6A or 6B. This Figure is useful when referring to Table 3 below.

FIG. 6C illustrates a further low thrust thruster embodiment, wherein low thrust thruster nozzles are arranged in a V-configuration with an angle θ therebetween that is in a range of about 10° to about 90°. In one presently preferred embodiment the angle θ is about 20°. The view of FIG. 6C is taken looking at the edge of the plane of the solar array 26 of FIGS. 6A and 6B. This Figure also shows the spacecraft center of mass (s/c cm). The thrust vectors of the four low thrust thrusters 24 are shown to lie in a second plane that is perpendicular to the plane of the solar array 26, although in other embodiments the second plane may not be perpendicular to the plane of the solar array 26. The low thrust thruster nozzles (1), (2), (3) and (4) provide the required torque capability to perform attitude control and momentum management, and can be used to counteract the solar torque induced by illumination of the opposite side of the solar array 26. FIGS. 6A and 6B illustrate possible locations for the low thrust thrusters 24 on the ends of spacecraft appendages, such as the solar array panel 26. The low thrust thrusters 1–4 on the solar array 26 are orientated principally to cancel the unidirectional solar torque imparted to the spacecraft by solar illumination of the asymmetrically mounted array 26. As can be seen best in FIG. 6C, the thruster nozzles 1–4 on the solar array 26 are directed to fire on the non-illuminated (i.e. shadow) side of the solar array 26. Thus, in accordance with a scope of the present invention, the thrust jets of the low thrust thrusters 1–4 used for 3-axes momentum management of the spacecraft are maintained on the shadow side of the solar array 26. This substantially prevents loss of solar illumination with an associated loss in performance of the solar array 26 when the low thrust thrusters 1–4 are fired to control spacecraft attitude. As shown in FIG. 4B, the low thrust thrusters 1–4 may otherwise be located on the spacecraft bus, offset from the center of mass of the spacecraft to cancel the unidirectional solar torque on the spacecraft and provide 3-axes momentum management of the spacecraft.

As an example, a spacecraft is designed to produce a negative roll solar torque (−Tx), and the low thrust thrusters 24 are utilized in combination, along with the solar disturbance torque, as shown in Table 3 to produce torque about any three axes. Standard control laws may then use this 3-axis torque capability for control of 3-axis spacecraft attitude or momentum. It should be noted that the labelling of the coordinate axes are for illustrative purposes, while the configuration and utilization method is general and is applicable as well to other coordinate definitions. As illustrated in Table 3, the four low thrust thrusters 1–4 on the solar array panel 26 are adequate for providing 3-axes momentum management of the spacecraft without firing other spacecraft thrusters.

Low thrust thrusters, such as pulse plasma thrusters and field emission electric propulsion, that are designed with a single thruster (electronics) 2-nozzle configuration can be arranged in the illustrated configuration and operated in the manner stated above to achieve control of 3-axes of spacecraft attitude or momentum.

TABLE 3

| Desired Activity | Active Components | Torque | | |
|---|---|---|---|---|
| | | Tx | Ty | Tz |
| Solar Torque only | ST | − | 0 | 0 |
| Thruster one only | 1 | + | + | − |
| Thruster two only | 2 | + | + | + |
| Thruster three only | 3 | + | − | − |
| Thruster four only | 4 | + | − | + |
| Zero Torque | ST + 1 + 4 | 0 | 0 | 0 |
| Zero Torque | ST + 2 + 3 | 0 | 0 | 0 |
| Plus Roll Torque | ST + 2 * (1 + 4) | + | 0 | 0 |
| Plus Roll Torque | ST + 2 * (2 + 3) | + | 0 | 0 |
| Plus Roll Torque | ST + 1 + 2 + 3 + 4 | + | 0 | 0 |
| Minus Roll Torque | ST | − | 0 | 0 |
| Plus Pitch Torque | ST + 1 + 2 | 0 | + | 0 |
| Minus Pitch Torque | ST + 3 + 4 | 0 | − | 0 |
| Plus Yaw Torque | ST + 2 + 4 | 0 | 0 | + |
| Minus Yaw Torque | ST + 1 + 3 | 0 | 0 | − |

While the invention has been particularly shown and described with respect to preferred embodiments thereof, it will be understood by those skilled in the art that changes in form and details may be made therein without departing from the scope and spirit of the invention.

What is claimed is:

1. A spacecraft comprising a plurality of low thrust thrusters mounted at predetermined locations on at least one of a spacecraft appendage or a spacecraft bus, said plurality of low thrust thrusters being located asymmetrically about a center of mass of the spacecraft wherein said plurality of low thrust thrusters are fired for providing 3-axes momentum management of the spacecraft.

2. A spacecraft as in claim 1, wherein said low thrust thrusters are mounted on a solar array panel.

3. A spacecraft comprising a first set of four low thrust thrusters and a second set of four, redundant, low thrust thrusters, said first and second sets of low thrust thrusters being mounted in a predetermined configuration on a spacecraft appendage or a spacecraft bus, wherein both the first set of low thrust thrusters, and the second set of low thrust thrusters are asymmetrically offset from a center of mass of the spacecraft, and wherein selected low thrust thrusters of the first set or the second set of low thrust thrusters are fired in pairs for achieving 3-axes momentum management of the spacecraft.

4. A spacecraft as in claim 3, wherein said low thrust thrusters are mounted adjacent to an end of a solar array panel.

5. A spacecraft as in claim 4, wherein a longitudinal axis of said solar array panel passes through said spacecraft bus.

6. A spacecraft as in claim 4, wherein at least the first set of low thrust thrusters providing 3-axes momentum management of the spacecraft are orientated to fire on a non-illuminated side of the solar array panel.

7. A spacecraft as set forth in claim 3, wherein said spacecraft is a three axis stabilized spacecraft.

8. A spacecraft having an inertial reference system and a plurality of attitude sensors, said spacecraft having a configuration generating a predetermined unidirectional environmental torque on the spacecraft, said spacecraft comprising:

a controller, responsive to inputs from said inertial reference system and at least one of said attitude sensors, for generating thruster on-time firing commands; and a plurality of thrusters including at least one high thrust thruster and a plurality of low thrust thrusters;

wherein said plurality of low thrust thrusters are disposed asymmetrically on the spacecraft at a distance from a center of mass of the spacecraft, each of the plurality of low thrust thrusters having a thrust vector pointing away from the spacecraft in a direction for canceling said unidirectional environmental torque on said spacecraft, and wherein selected ones of said low thrust thrusters are fired to counteract said predetermined environmental torque acting on said spacecraft, and for providing 3-axes spacecraft momentum management in cooperation with the said environmental torque.

9. A spacecraft as in claim 8, wherein said low thrust thrusters are mounted on one of a spacecraft bus or a spacecraft appendage.

10. A spacecraft as in claim 8, wherein said low thrust thrusters are comprised of pulse plasma thrusters or field emission electric propulsion.

11. A spacecraft as in claim 8, wherein each of said plurality of low thrust thrusters has a low average thrust level, a small minimum impulse quantization, a large throttle ability range, and a high specific impulse.

12. A spacecraft as in claim 8, wherein there are four low thrust thrusters.

13. A spacecraft as in claim 8, wherein there is a primary set of four low thrust thrusters and a redundant set of four low thrust thrusters.

14. A spacecraft having an inertial reference system and a plurality of attitude sensors, said spacecraft further having at least one solar array panel extending from near a center of mass of said spacecraft in an asymmetrical configuration, said spacecraft further comprising;

a controller, responsive to inputs from said inertial reference system and at least one of said attitude sensors, for generating thruster on-time firing commands; and a plurality of thrusters including at least one high thrust thruster and a plurality of low thrust thrusters, said plurality of low thrust thrusters being mounted at a peripheral portion of said at least one asymmetrical solar array panel and being selectively energized in pairs to generate positive or negative torques, wherein said plurality of low thrust thrusters on said at least one solar array panel provide 3-axes momentum management of said spacecraft.

15. A spacecraft as in claim 14, wherein said low thrust thrusters are comprised of pulse plasma thrusters or field emission electric propulsion.

16. A spacecraft as in claim 14, wherein each of said plurality of low thrust thrusters has a low average thrust level, a small minimum impulse quantization, a large throttle ability range, and a high specific impulse.

17. A spacecraft as in claim 14, wherein there are four low thrust thrusters.

18. A spacecraft as in claim 14, wherein there is a primary set of four low thrust thrusters and a redundant set of four low thrust thrusters.

19. A spacecraft as in claim 14, wherein the plurality of low thrust thrusters on the at least one solar array panel are orientated to fire on a non-illuminated side of the at least one solar array panel.

20. A spacecraft comprising a plurality of low thrust thrusters comprising at least two sets of two low thrust thrusters, individual ones of the low thrust thrusters of a set being arranged in a V-configuration and mounted at predetermined locations on a spacecraft appendage, or a spacecraft bus, the plurality of low thrust thrusters standing-off asymmetrically from a center of mass of the spacecraft, wherein said plurality of low thrust thrusters are selectively energized for controlling spacecraft attitude or momentum about 3-axes.

21. A spacecraft as in claim 20, wherein said plurality of low thrust thrusters are mounted at a peripheral portion of a solar array panel and are selectively energized to generate positive or negative torques about a center of mass of said spacecraft.

22. A spacecraft as in claim 20, wherein said low thrust thrusters are comprised of pulse plasma thrusters or field emission electric propulsion.

23. A spacecraft as in claim 20, wherein there two sets of two low thrust thrusters.

24. A spacecraft of a type comprising at least one solar array extending from a spacecraft bus and inducing an asymmetric solar torque imbalance, said spacecraft further comprising:

at least two sets of two low thrust thrusters coupled to said at least one solar array, individual ones of the low thrust thrusters of a set having thrust vectors disposed at an angle θ one to another and being asymmetrically offset at a distance from a center of mass of the spacecraft, said plurality of low thrust thrusters being selectively energized for achieving, in cooperation with the solar torque imbalance, a torque about any one of three spacecraft axes.

25. A spacecraft as in claim 24, wherein said plurality of low thrust thrusters are mounted at a peripheral portion of the at least one solar array.

26. A spacecraft as in claim 24, wherein the angle θ is in a range of about 10° to about 90°.

27. A spacecraft as in claim 24, wherein the angle θ is about 20°.

28. A spacecraft as in claim 24, wherein the plane that contains the thrust vectors is perpendicular to the plane of the at least one solar array.

29. A spacecraft as in claim 24, wherein the plane that contains the thrust vectors is perpendicular to the plane of the at least one solar array, wherein the thrust vectors of a set of low thrust thrusters are separated from one another by an angle of about 20° and are directed into space from a side of said at least one solar array that is opposite a side of the at least one solar array that receives solar illumination.

30. A spacecraft as in claim 24, wherein said low thrust thrusters are comprised of pulse plasma thrusters or field emission electric propulsion.

31. A method for operating a spacecraft, comprising steps of:

providing the spacecraft with a configuration generating a predetermined unidirectional environmental torque on the spacecraft;

providing the spacecraft with a plurality of low thrust thrusters comprising at least two sets of two low thrust thrusters, individual ones of the low thrust thrusters of a set being arranged in a V-configuration and mounted at predetermined locations on an appendage of the spacecraft;

selectively firing the low thrust thrusters on the appendage for canceling the unidirectional torque on the spacecraft; and in combination with the unidirectional torque on the spacecraft controlling 3-axes of spacecraft attitude or momentum with the low thrust thrusters.

32. A method for operating a spacecraft of a type comprising at least one solar array extending asymmetrically from a spacecraft bus generating a predetermined environmental torque on the spacecraft, the method comprising steps of:

providing at least two sets of two low thrust thrusters coupled to the at least one solar array, individual ones of the low thrust thrusters of a set having thrust vectors disposed at an angle one to another and lying in at least one plane that intersects a plane of the at least one solar array; and selectively energizing the low thrust thrusters on the at least one solar array without energizing other thursters of the spacecraft for achieving, in cooperation with the predetermined torque, a desired torque about any one of three spacecraft axes.

33. A spacecraft comprising a plurality of low thrust thrusters mounted on at least one of a spacecraft appendage or a spacecraft bus, the plurality of low thrust thrusters being located offset in generally one direction from a center of mass of the spacecraft, wherein the plurality of low thrust thrusters are selectively energized in pairs for generating a predetermined positive or negative torque about 3-axes of the spacecraft.

* * * * *